(12) United States Patent
Chung

(10) Patent No.: US 6,594,411 B2
(45) Date of Patent: Jul. 15, 2003

(54) OPTICAL SWITCH

(75) Inventor: Yueh Liang Chung, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 124 days.

(21) Appl. No.: 09/802,428

(22) Filed: Mar. 9, 2001

(65) Prior Publication Data

US 2002/0085789 A1 Jul. 4, 2002

(30) Foreign Application Priority Data

Dec. 28, 2000 (TW) .................................... 89222644 U

(51) Int. Cl.[7] ................................................. G02B 6/26
(52) U.S. Cl. ............................... 385/16; 385/39; 385/44
(58) Field of Search ............................. 385/16–18, 25, 385/114, 39.44

(56) References Cited

U.S. PATENT DOCUMENTS 4,176,908 A * 12/1979 Wagner ........................ 385/25
4,456,329 A * 6/1984 Henderson et al. ......... 359/114
6,393,175 B1 * 5/2002 Jurbergs et al. ............... 385/16

* cited by examiner

Primary Examiner—Ellen E. Kim
(74) Attorney, Agent, or Firm—Wei Te Chung

(57) ABSTRACT

An optical switch includes a casing in which a fixed first crystal element having a first surface and a moveable second crystal element sharing the same refracting index with the first crystal element and having a second surface corresponding to the first surface of the first crystal element are arranged. A driving device selectively drives the second crystal element to move relative to the first crystal element between a first position and a second position. In the first position, the second surface of the second crystal element abuts against the first surface of the first crystal element, to allow a light beam transmitting into the first crystal element to pass through the second crystal element without substantial reflection. In the second position, the first and second surfaces are separated from each other, forming a gap therebetween whereby a light beam transmitting into the first crystal element is fully reflected on the first surface and leaves the optical switch in different direction thereby achieving switching operation.

14 Claims, 4 Drawing Sheets

OPTICAL SWITCH

BACKGROUND OF THE INVENTION

1. Field of the Invention

The present invention relates to an optical switch, and particularly to an optical switch which achieves switching operation by employing a piezoelectric device to control the movement of a crystal element thereof.

2. Description of Related Art

A typical optical switch has one or more light input port(s) and at least two light output ports for performing switching or logical operations to optical signals in a light transmitting line/system or in an integrated optical circuit. Factors for assessing the capability of an optical switch include low insertion loss (IL, <1 db), good isolation performance (>50 db), and fast switching speed (normally, tens of milliseconds).

One elementary kind of the traditional mechanical switches is operated by moving an input fiber relative to a plurality of output fibers. An example of the conventional design is disclosed in U.S. Pat. Nos. 4,303,302 and 4,896,935. However, these conventional optical switches share a common problem of requiring high precision parts to obtain precise positioning control and low insertion loss. This results in high costs and complicates manufacture of the switches. Moreover, frequently moving fibers to and fro is apt to damage or even break the fibers.

Another traditional mechanical optical switch realizes its switching function by moving optical elements, such as sleeves, collimating members and reflectors, between light input and output ports. FIGS. 1 and 2 show an example of an optical switch of this type disclosed in U.S. Pat. No. 4,705,349. A switch 10 comprises a mounting fixture 12, optical fibers 14, 16 and 18, a rotatable table 32 and a planar reflector 36. The reflector 36 is mounted on the rotating substrate 32 to be moveable therewith. Light from fibers 14, 16 is selectively directed by the reflector 36 into the fiber 18 by rotating the rotatable table 32. A setting screw 38 is used for precise positioning of the rotatable stable 32. Due to possible fatigue during operation, the arrangement is not very reliable. In addition, a spring device (not shown in FIGS. 1 and 2) is adopted to drive the rotatable table 32, resulting in a slow switching speed. Furthermore, such a design inevitably has disadvantages as high costs and complicated manufacture requirements.

BRIEF SUMMARY OF THE INVENTION

An object of the present invention is to provide an optical switch employing crystal members as its transmitting medium thereby obtaining a low insertion loss thereof.

Another object of the present invention is to provide an optical switch having a high switching speed by adopting a piezoelectric device to control light paths of the switch.

In accordance with one aspect of the present invention, an optical switch comprises a fixed first crystal element having a first surface, a movable second crystal element sharing the same refracting index with the first crystal element and having a second surface corresponding to the first surface of the first crystal element, and a driving device for driving the second crystal element to move relative to the first crystal element between first and second positions. The driving device comprises a piezoelectric element.

In the first position, the second surface of the second crystal element abuts against the first surface of the first crystal element, allowing a light beam transmitting into the first crystal element to pass through the second crystal element without substantial reflection.

In the second position, a gap is formed between the first surface and the second surface of the first and second crystal elements whereby a light beam transmitting into the first crystal element is fully reflected on the first surface and no longer passes the second crystal element. Thus, the light beam leaves the switch in different directions, achieving a switching operation.

Guiding members are positioned on opposite sides of the second crystal element to guide the movement thereof. At least one of the guiding members has a pair of spaced arms extending from a base with a space defined therebetween. Slots are defined in opposing edges of the arms for receiving and thus guiding the second crystal element.

DETAILED DESCRIPTION OF THE INVENTION

Figure 1:
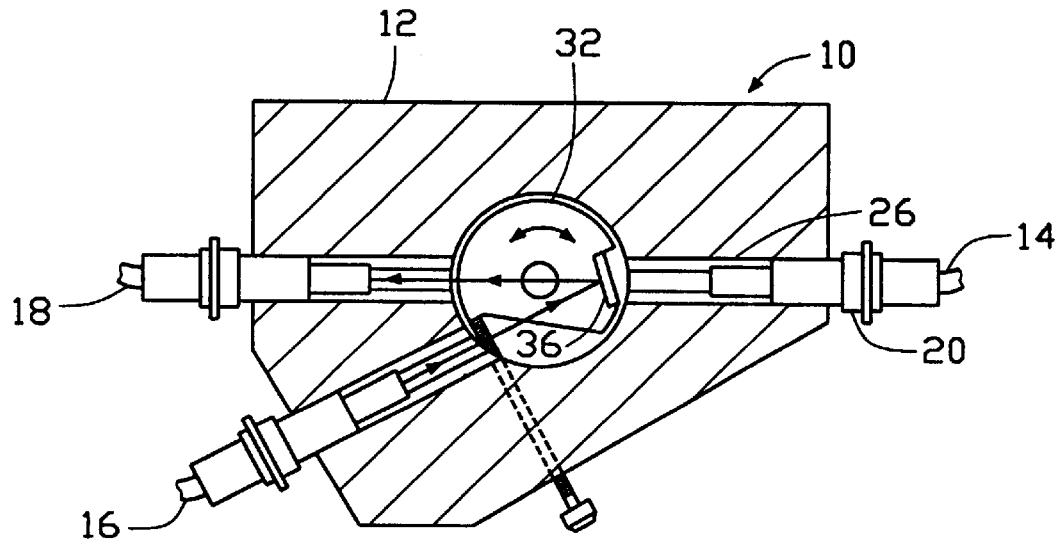
FIG. 1 is a cross-sectional view of a conventional optical switch.
Figure 2:
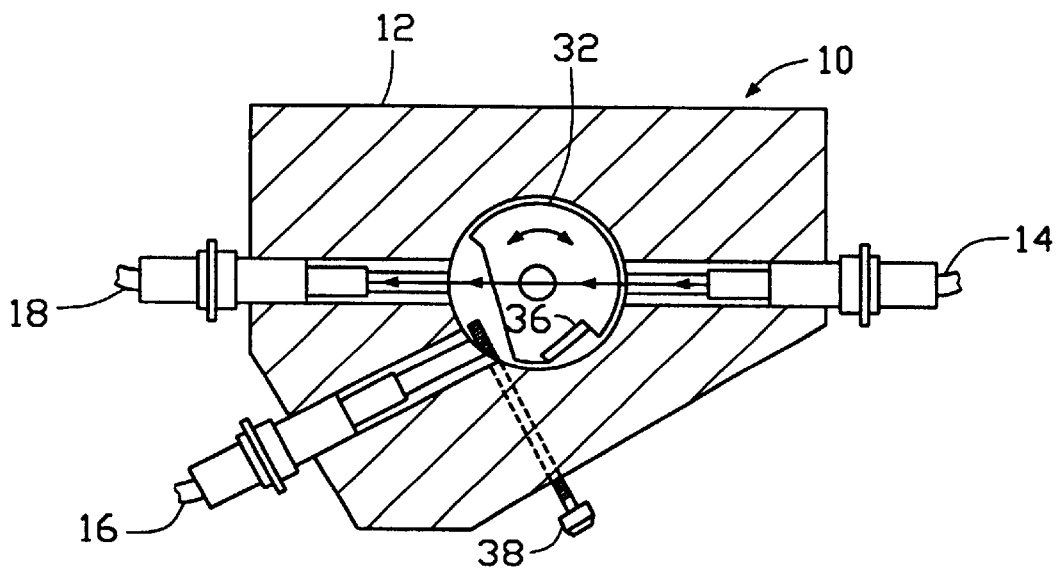
FIG. 2 is another cross-sectional view of the conventional optical switch.
Figure 3A:
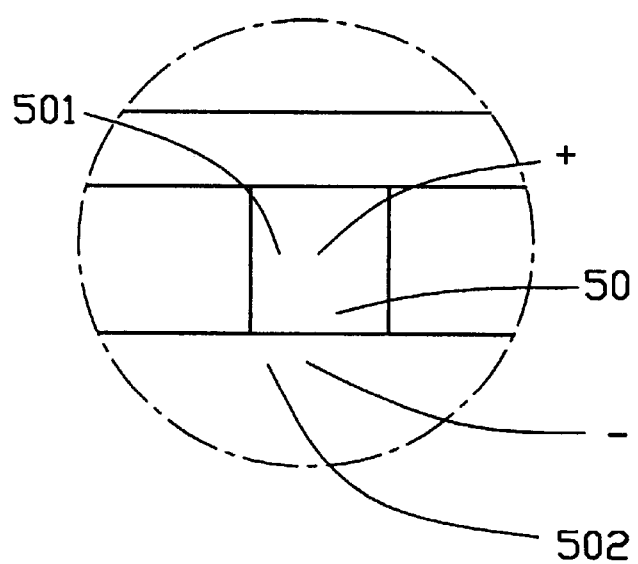
FIG. 3A is an partially enlarged view of FIG. 3.
Figure 3:
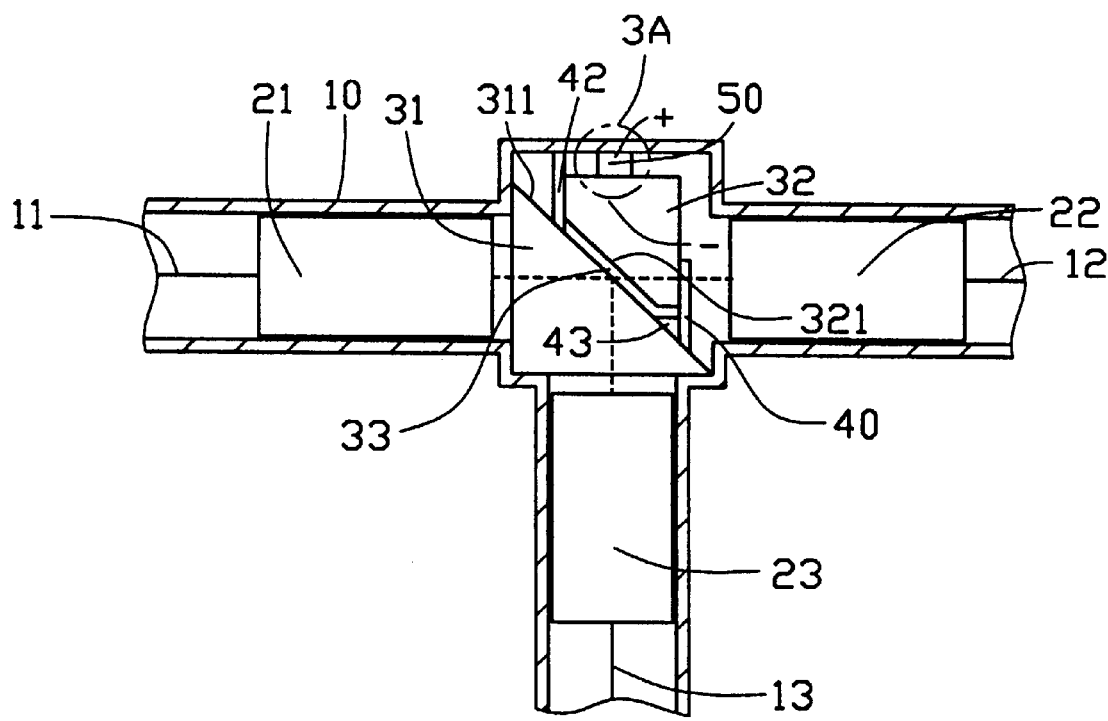
FIG. 3 is a cross-sectional view of an optical switch in accordance with the present invention, the optical switch being in a first position.
Figure 4:
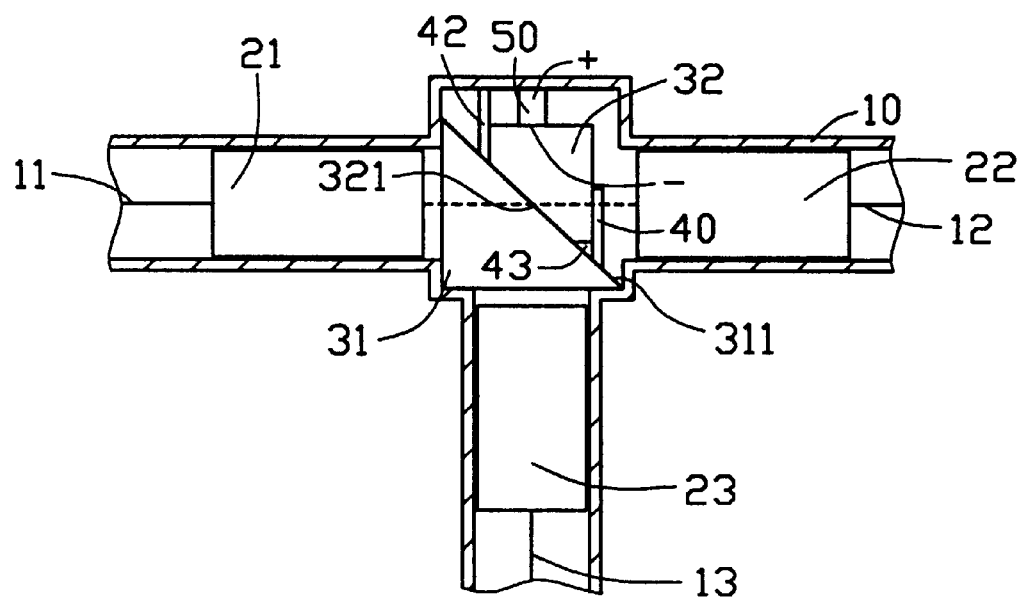
FIG. 4 is similar to FIG. 3 but showing the optical switch in a second position.

As shown in FIGS. 3 and 4, an optical switch in accordance with the present invention comprises a shell 10 for accommodation of a first crystal element 31 having a first surface 311 and a second crystal element 32 having a second surface 321 corresponding to the first surface 311 of the first crystal element 31. The first crystal element 31 is fixed while the second crystal element is moveable with respect to the first crystal element 31 between a first, separated position (FIG. 3) and a second, contact position (FIG. 4) where the surfaces 311, 321 contact each other. A driving device 50 is coupled to the second crystal element 32 for moving between the first position and the second position. The first and second crystal elements 31, 32 share the same refracting index (RI) which is selected to satisfy full-reflection between the crystal elements 31, 32 and the air, Theoretically, the refraction index meets the inequality RI>= 1.414.

A first collimating device 21 is positioned on one side of the first crystal element 31 so that a first optical axis of the first collimating device 21 forms a certain degree angle, preferably 45 degree, with the first surface 311. The certain degree angle, here preferably 45 degree, enables the incident angle of an incident light beam from the first collimating device 21 to satisfy the requirement of full-reflection when there is a gap 33 between the first and second crystal elements 31, 32 as detailed below. A second collimating device 22 is positioned on one side of the second crystal element 32, opposite to the first collimating device 21 whereby a second optic axis of the second collimating device 22 is coincident with the first optic axis. A third collimating device 23 is positioned adjacent the first collimating device 21 so that a third optic axis of the third collimating device 23 is perpendicular to the first and second optic axes of the first and second collimating devices 21, 22 and thus forming a 45 degree angle with the first surface 311. A first, second and third optical fibers 11, 12 and 13 are connected to the first, second and third collimating devices 21, 22 and 23 respectively.

Also referring to FIG. 3A, the driving device 50 can be any suitable device that is capable of moving the second crystal element 32 with respect to the first collimating device 31. As illustrated in the preferred embodiment shown, the driving device 50 is a piezoelectric element. The piezoelectric element 50 has a fixed end 501 attached to the shell 10 and a movable end 502 attached to the second crystal element 32 whereby the piezoelectric element 50 changes dimensions upon application of electrical signal thereto to move the second crystal element 32.

Figure 5:
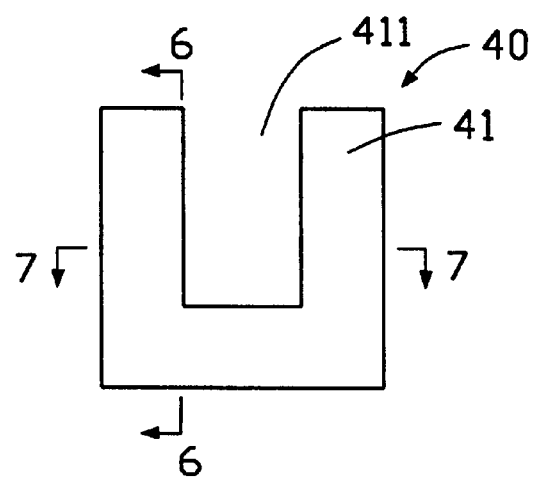
FIG. 5 is an elevation view of a guiding member of the optical switch of the present invention.
Figure 6:
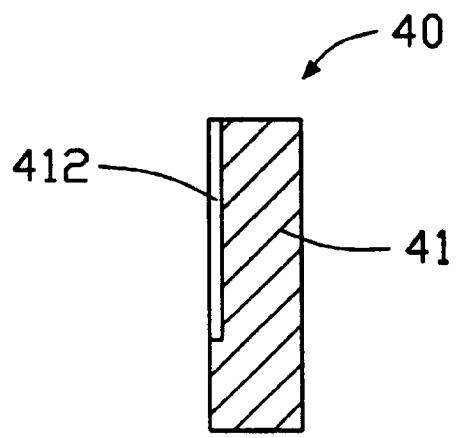
FIG. 6 is a cross-sectional view of the guiding member taken along line 6—6 of FIG. 5.
Figure 7:
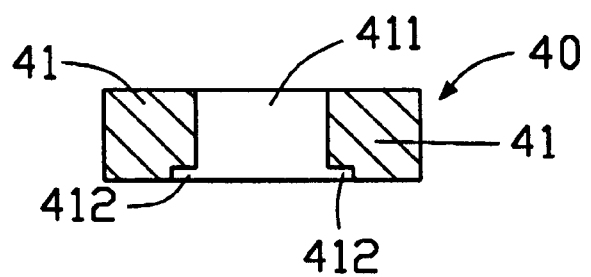
FIG. 7 is a cross-sectional view of the guiding member taken along line 7—7 of FIG. 5.

Also referring to FIGS. 5, 6 and 7, a pair of guiding members 40, 42 is positioned on opposite sides of the second crystal element 32 for guiding the movement thereof. The guiding member 40 is a U-shaped member having a pair of spaced arms 41 extending from a base 44 with a space 411 therebetween to avoid blocking light beam from the first optic fiber 11 to the second optic fiber 12. A slot 412 is defined along an edge of each arm 41. The slots 412 face each other for guidingly receiving opposite edges of the second crystal element 32.

A buffering device 43 is arranged between the first surface 311 of the first crystal element 31 and the second surface 321 of the second crystal 32 for protecting the crystal elements 31, 32 from being damaged by serious impact.

By applying a pre-determined bias voltage to the piezoelectric element 50 (preferably positive voltage on the fixed end 501 and negative voltage on the movable end 502), the piezoelectric element 50 extends and thus moves the second crystal element 32 from the separated position toward the contact position by being guided by the guiding members 40, 42. The movement of the second crystal element 32 is stopped by the buffering device 43 when the second crystal element 32 reaches the pre-determined contact position.

In the contact position, the second surface 321 of the second crystal element 32 abuts against the first surface 311 of the first crystal element 31 forming a surface contact therebetween, so that a light beam transmitting into the first crystal element 31 passes through the second crystal element 32 and exits via the second collimating device 22 and the second fiber 12.

When the bias voltage is removed, the piezoelectric device 50 retracts back to its original length thereby moving the second crystal element 32 from the contact position to the separated position and thus separating the first and second surfaces 311, 321. The gap 33 is formed between the first and second surfaces 311, 321. A light beam transmitting into the first crystal element 31 is fully reflected by the first surface 311 and exits from the first crystal element 31 via the third collimating device 23 and the third optic fiber 13.

Since the optical switch of the present invention only employs crystal elements as light transmitting medium, the insertion loss (IL) introduced by the switch is thus made minimal so long as the collimating devices 21, 22, 23 work normally. The switch also has the advantages of good reliability without the need of moving optical fibers thereof, and relatively fast switching speed by using the piezoelectric device 50 as the driving device thereof.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical switch comprising:
a first crystal element having a first surface;
a second crystal element sharing the same refracting index with the first crystal element and having a second surface corresponding to the first surface of the first crystal element, wherein a plurality of guiding members are positioned on opposite sides of the second crystal element for guiding the movement thereof and at least one of the guiding members has a pair of spaced arms extending from a base with a space defined between the arms; and
a driving device driving the second crystal element to selectively move relative to the first crystal element between a first position and a second position; wherein
in the first position, the second surface of the second crystal element abuts against the first surface of the first crystal element, so that a light beam transmitting into the first crystal element passes through the second crystal element and exits therefrom in a first direction; and
in the second position, a gap is formed between the first and second surfaces of the first and second crystal elements, so that a light beam transmitting into the first crystal element is fully reflected by the first surface and exits from the first crystal element in a second direction.

2. The optical switch as claimed in claim 1, wherein the driving device is a piezoelectric device.

3. The optical switch as claimed in claim 1, wherein slots are defined in opposing sides of the arms.

4. The optical switch as claimed in claim 1, wherein the first direction is perpendicular to the second direction.

5. The optical switch as claimed in claim 4, wherein a first collimating device is positioned on one side of the first crystal element for guiding a light beam into the first crystal element.

6. The optical switch as claimed in claim 5, wherein a second collimating device is positioned on one side of the second crystal element for guiding a light beam away from the second crystal element in the first direction.

7. The optical switch as claimed in claim 5, wherein a third collimating device is positioned adjacent the first crystal element for guiding the light beam away from the first collimating device in the second direction.

8. The optical switch as claimed in claim 1, wherein the switch comprises a casing for accommodating the crystal elements.

9. A method of switching a light path, comprising the steps of:
providing a stationary first crystal element wit a slanted end surface with regard to an axis thereof providing a second crystal element with a corresponding slanted end surface complaint with and adapted to abut against said slanted end surface of the first crystal element;

providing a driving device to move at least one of the first and second crystal elements close to or away from the other;

providing stationary first, second and third collimating devices around said first and second crystal elements, the first collimating device and the second collimating device aligned with each other along a first direction while the third collimating device being angled with both said first and second collimating devices; wherein light entering the first crystal element via the first collimating device is fully reflected by the slanted end surface of the first crystal element toward the third collimating device when the second crystal element is spaced from said first crystal element with an air gap therebetween; while light entering the fist crystal element via the first collimating device is penetrates both the first and second collimating device toward the second collimating device when said second crystal element is moveably driven to abut against the first crystal element with no air gap therebetween; wherein said second crystal element is moveable relative to the first crystal element in a second direction angled with said first direction.

10. An optical switch comprising:

first and second crystal elements moveable relative to each other to form an air gap optionally provided therebetween, wherein a plurality of guiding members are positioned on opposite sides of the second crystal element for guiding the movement thereof and at least one of the guiding members has a pair of spaced arms extending from a base with a space defined between the arms;

a common input port disposed beside the first crystal element;

two output ports respectively disposed beside the first crystal element and the second crystal element; wherein light enters the common input port and leaves via the output port beside the second crystal element when no air gap is formed between the first crystal element and the second crystal element; while light enters the common input port and leaves via the output port beside the first crystal element when an air gap is formed between the first crystal element and the second crystal element.

11. The optical switch as claimed in claim 10, wherein the light in the output port beside the first crystal element is derived from reflection at the gap between the first and second crystal elements, while the light in the output port beside the second crystal element is derived from penetrating the first and second crystal elements.

12. The optical switch as claimed in claim 11, wherein said first crystal element defines a slanted end surface relative to an optical axis of the common input port, and the reflection occurs on said slanted end surface.

13. The optical switch as claimed in claim 12, wherein said second crystal element defines a slanted end surface corresponding to and parallel to said slanted end surface of the first crystal element.

14. The optical switch as claimed in claim 10, wherein both the first crystal element and the second crystal element have the same refraction index.

* * * * *